(12) United States Patent
Kitten et al.

(10) Patent No.: US 6,981,076 B1
(45) Date of Patent: Dec. 27, 2005

(54) MECHANISM TO DISABLE DYNAMICALLY A COMPUTER AUDIO INPUT/OUTPUT CONNECTOR

(75) Inventors: Gary S. Kitten, Austin, TX (US); Anthony B. Armstrong, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 401 days.

(21) Appl. No.: 09/672,131

(22) Filed: Sep. 27, 2000

(51) Int. Cl.[7] .......................... G06F 13/00; H04M 1/00
(52) U.S. Cl. ...................... 710/100; 710/14; 713/323; 379/388.02
(58) Field of Search ........................ 345/520; 361/42; 369/47.27; 379/388.02, 88.07, 308; 381/58, 381/59, 56; 439/607; 84/736; 320/148; 330/107, 330/251, 254; 327/385; 710/14; 713/323; 714/805; 455/563; 73/31.06

(56) References Cited

U.S. PATENT DOCUMENTS

| | | | | |
|---|---|---|---|---|
| 3,822,386 A | * | 7/1974 | Gontowski, Jr. ............. | 327/385 |
| 4,303,889 A | * | 12/1981 | Yokoyama et al. .......... | 330/107 |
| 4,776,203 A | * | 10/1988 | Jones et al. ................. | 73/31.06 |
| 4,823,093 A | * | 4/1989 | Frey ............................ | 330/254 |
| 5,268,527 A | * | 12/1993 | Waller, Jr. .................... | 84/736 |
| 5,553,220 A | * | 9/1996 | Keene ......................... | 345/520 |
| 5,563,952 A | * | 10/1996 | Mercer ......................... | 381/56 |
| 5,675,641 A | * | 10/1997 | Watanabe et al. ......... | 379/388.02 |
| 5,747,967 A | * | 5/1998 | Muljadi et al. .............. | 320/148 |
| 5,815,352 A | * | 9/1998 | Mackenzie ................... | 361/42 |
| 5,822,406 A | * | 10/1998 | Brown ...................... | 379/88.07 |
| 5,898,340 A | * | 4/1999 | Chatterjee et al. ......... | 330/251 |
| 5,910,991 A | * | 6/1999 | Farrar ......................... | 381/59 |
| 6,050,854 A | * | 4/2000 | Fang et al. .................. | 439/607 |
| 6,091,812 A | * | 7/2000 | Iglehart et al. ............. | 379/308 |
| 6,128,263 A | * | 10/2000 | Fujii et al. ............... | 369/47.27 |
| 6,321,278 B1 | * | 11/2001 | Phu et al. ..................... | 710/14 |
| 6,359,987 B1 | * | 3/2002 | Tran et al. .................... | 381/58 |
| 6,459,911 B1 | * | 10/2002 | Hijii .......................... | 455/563 |
| 6,574,740 B1 | * | 6/2003 | Odaohhara et al. ......... | 713/323 |
| 6,643,822 B1 | * | 11/2003 | Murthy ...................... | 714/805 |

OTHER PUBLICATIONS

David Konetski and Joe Curley, *Integrated Self Diagnostics for Louspeaker Systems*, Filed Jul. 23, 1999, U.S. Appl. No. 09/360,060.

Art Achariyakosol and David Konetski, *1/8" Stereo Jack Dual SPDIF*, Filed Nov. 23, 1999, U.S. Appl. 09/447,961.

* cited by examiner

Primary Examiner—Glenn A. Auve
Assistant Examiner—Christopher E. Lee
(74) Attorney, Agent, or Firm—Haynes and Boone, LLP

(57) ABSTRACT

An apparatus and method are presented for dynamically disabling a first audio input/output ("I/O") connector when an audio I/O device is coupled to a second audio I/O connector, locating the disablement point to reduce significantly any spurious noise coupled onto the primary audio I/O connector and its associated electrical components and cabling. An advantage is that it can be implemented with components that provide low resistance from the first audio I/O connector to ground, thoroughly grounding, and significantly reducing spurious noise coupled onto, the first audio I/O connector and associated electronics and cabling. This invention therefore also significantly reduces the spurious noise processed with, and therefore interfering with, the signal associated with a device coupled to a second audio I/O connector, significantly increasing the quality of the input or output signal from that secondary device. Another advantage is that the components required are relatively inexpensive and can be purchased in single units.

11 Claims, 2 Drawing Sheets

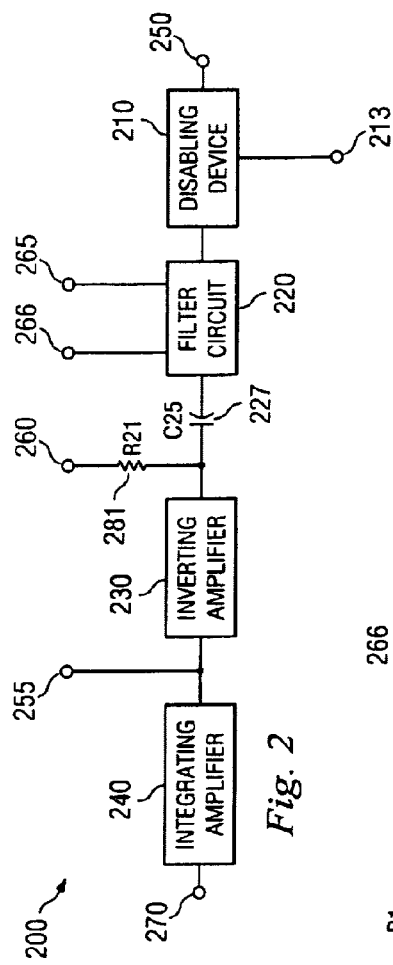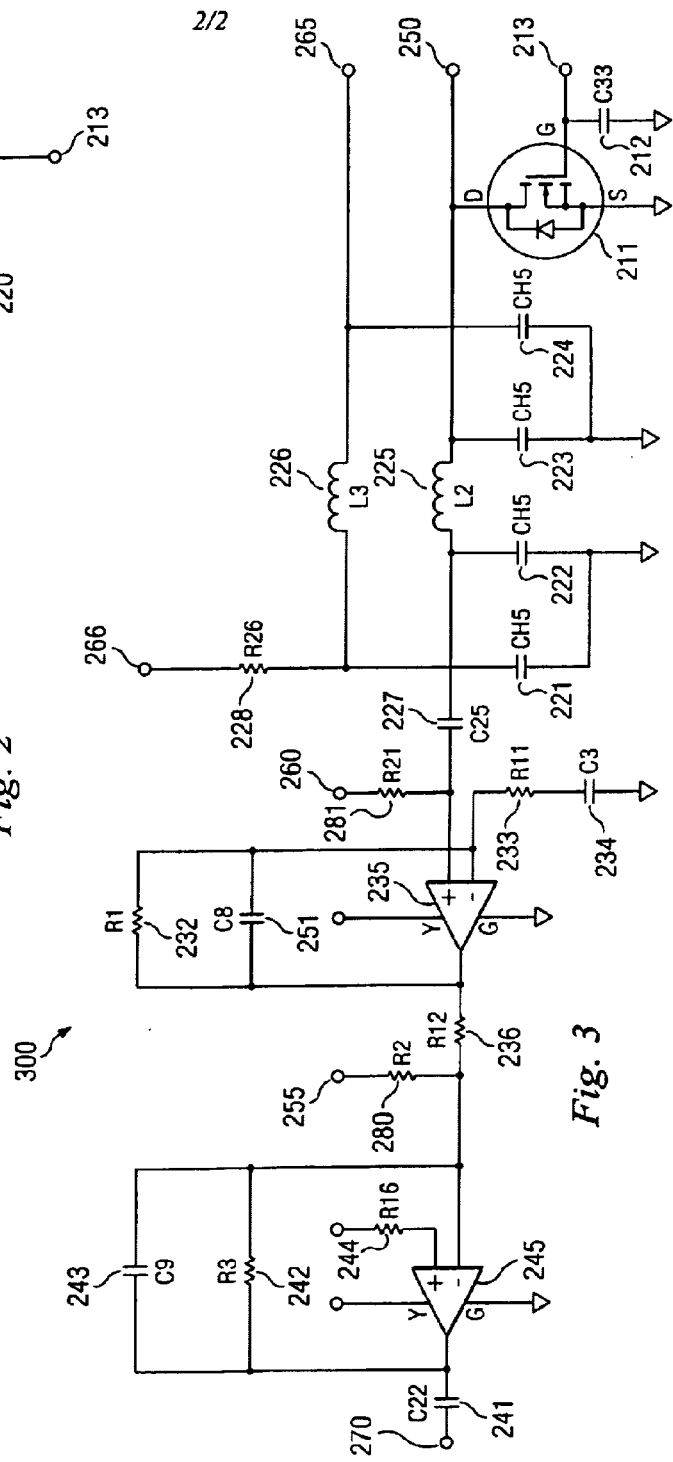
Fig. 2
Fig. 3

MECHANISM TO DISABLE DYNAMICALLY A COMPUTER AUDIO INPUT/OUTPUT CONNECTOR

BACKGROUND

The disclosure relates to audio connectors, and more particularly to an apparatus and method for significantly reducing spurious noise coupled onto one audio input/output ("I/O") connector and preventing such spurious noise from interfering with a signal from another audio I/O connector.

DESCRIPTION OF THE RELATED ART

Computer systems in general and personal computer systems in particular have attained widespread use for providing computer power to many segments of today's modern society. A personal computer system can usually be defined as a desktop, floor standing, or portable microcomputer that includes a system unit having a system processor and associated volatile and non-volatile memory, a display monitor, a keyboard, one or more removable storage devices, a fixed drive storage device, and an optional printer. One of the distinguishing characteristics of these systems is the use of a system board to connect these components together electronically. These personal computer systems are designed primarily to provide independent computing power to a single user (or to a relatively small group of users in the case of personal computers that serve as computer server systems) and are inexpensively priced for purchase by individuals or small businesses. A personal computer system may also include one or more of a plurality of I/O devices (i.e., peripheral devices) that are coupled to the system processor and that perform specialized functions. Examples of peripheral devices include modems, sound and video devices, or specialized communication devices. Mass storage devices such as hard disks, compact disk read only memory ("CD-ROM") drives, and magneto-optical drives are also considered to be peripheral devices. Computers capable of producing sound effects are in increasing demand as computers are used for business applications, artistic endeavors, entertainment, and education. Computers requiring audio inputs through devices such as microphones are in increasing demand as computers are used for applications requiring audio data inputs (e.g., dictation programs, video conferencing, Voice over Internet Protocol ("VoIP"), and voice recognition programs).

Computer systems today often include audio controllers (e.g., sound cards) to which audio I/O peripheral devices (e.g., microphones and speaker systems) can be attached for the input or output and processing of signals representing sound. Most computer systems provide hardware audio I/O connectors such as jacks (i.e., connectors designed to receive plugs) via which such audio peripheral devices can be connected to the computer system's audio controller or integrated audio solution. Primary audio I/O connectors are often located at the back of a computer system to allow coupling of devices on a more permanent basis without crowding the work area at the front of the computer system. Secondary audio I/O connectors may be located on or near the front of a computer system to make them more accessible to users.

References to audio controllers and other integrated audio solutions, audio I/O connectors, and audio devices specifically include audiovisual controllers and other integrated audiovisual solutions, audiovisual I/O connectors, and audiovisual devices.

This placement of audio I/O connectors often gives rise to spurious noise coupled onto a primary audio I/O connector and its associated electrical components and cabling. This noise may be troublesome at any time, but particularly when a device is coupled to a secondary audio I/O connector. If this noise coupled onto the primary audio I/O connector is not significantly reduced, it is processed with, and in that sense interferes with, the signal associated with a device coupled to a secondary audio I/O connector, reducing the quality of the input or output from the device coupled to the secondary audio I/O connector. A challenge presented by this situation is the effective and inexpensive significant reduction of the spurious noise. One method of reducing this noise involves simply grounding the primary audio I/O connector when a device is coupled to a secondary I/O connector. This method, depending on the physical location of the coupling of the primary audio I/O connector to ground, may still allow the coupling of some spurious noise onto the primary audio I/O connector. Another method of reducing spurious noise coupled onto a primary audio I/O connector is to open the connection to the primary audio I/O connector when a device is coupled to a secondary I/O connector. The switches required for this, however, are manufactured in multiple units to a pack, making this method expensive to implement. Another method of reducing spurious noise coupled onto a primary audio I/O connector is to shield the connectors and their associated electrical components and cabling, but adequate shielding is also expensive to implement.

SUMMARY

The present disclosure relates to a method of dynamically disabling a primary audio I/O connector when a device is connected to a secondary audio I/O connector and locating the disablement point to significantly reduce any spurious noise coupled onto the primary audio I/O connector and its associated electrical components and cabling. In one embodiment, a transistor disables a primary audio I/O connector by pulling it to a zero voltage level when a device is coupled to a secondary audio I/O connector.

In another embodiment, a direct-current ("DC") blocking cap is included with the disabling device to prevent spurious noise from bleeding through the circuit.

In another embodiment, a mechanical switch detects the coupling of an audio I/O device coupled to a secondary audio I/O connector and disables a primary audio I/O connector.

One advantage of the present disclosure is that transistors are relatively inexpensive electronic components and can be purchased singly. Another advantage is that a transistor provides a low resistance from the primary audio cable to ground, ensuring that the cable is thoroughly grounded and significantly reducing the interference coupled onto the primary audio I/O connector and its associated electrical components and cabling.

An improvement to the reduction of spurious noise coupled onto a primary audio I/O connector is desirable that is more effective and less expensive than the methods now in use.

BRIEF DESCRIPTION OF THE DRAWINGS

The present disclosure may be better understood, and its numerous objects, features, and advantages made apparent to those skilled in the art, by referencing the accompanying drawings.

FIG. 2 is a functional block diagram of an exemplary computer audio circuit including an embodiment of the present disclosure.

FIG. 3 is a circuit diagram of an exemplary computer audio circuit including an embodiment of the present disclosure.

The use of the same reference symbols in different drawings indicates similar or identical items.

DESCRIPTION

Figure 1:
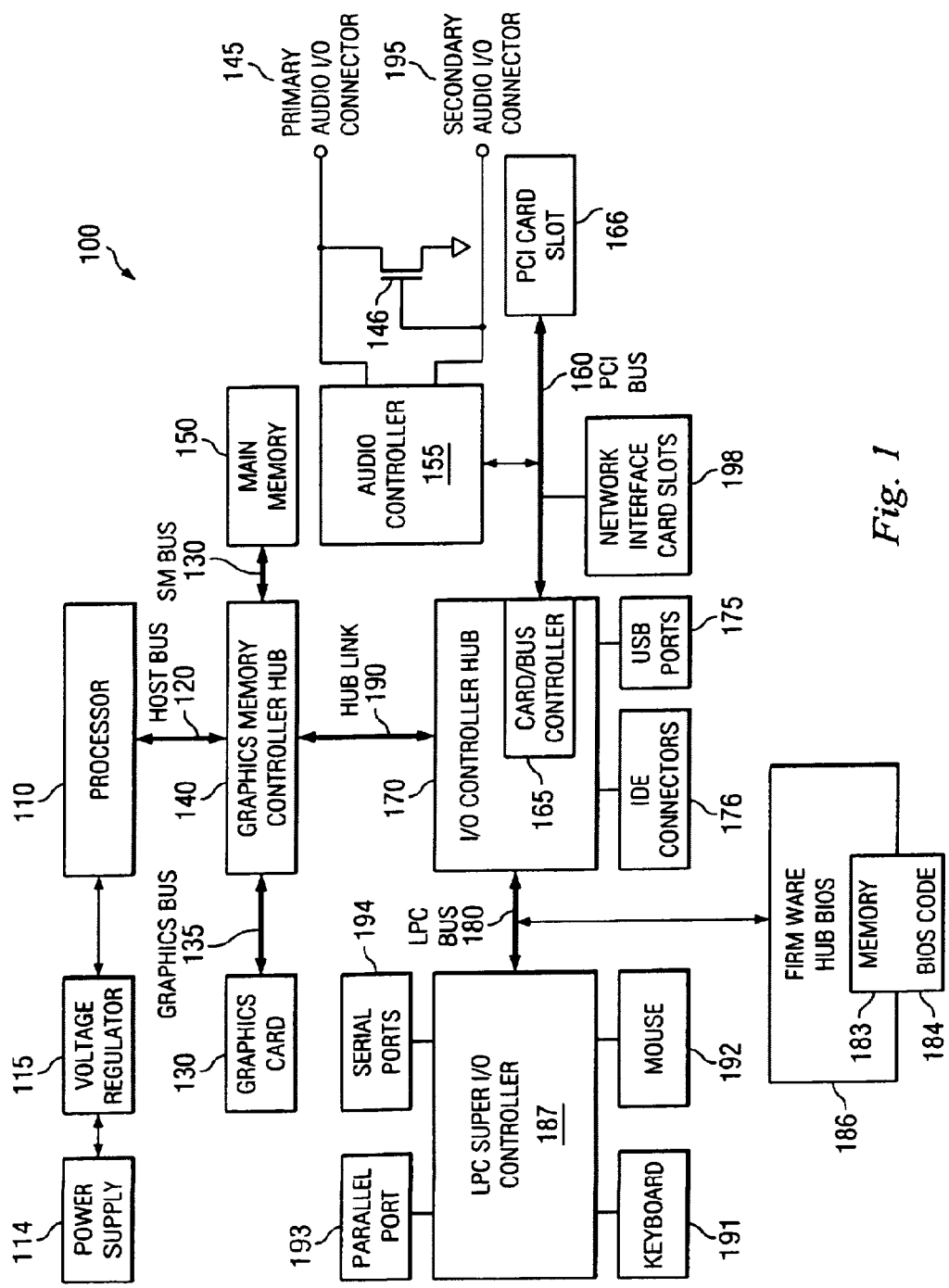
FIG. 1 is a block diagram of a typical computer system with which the present disclosure may be used.

The following sets forth a detailed description of a mode for carrying out illustrative embodiments of the disclosure and should not be taken to be limiting.

FIG. 1 is a block diagram of an exemplary computer system 100 that may be found in many forms, including, for example, mainframes, minicomputers, workstations, servers, personal computers, internet terminals, notebooks, and embedded systems. Personal computer ("PC") systems, such as those compatible with the x86 configuration, include desktop, floor standing, or portable versions. A typical PC system 100 is a microcomputer that includes a microprocessor (or simply "processor") 110, associated main memory 150 and control logic and a number of peripheral devices that provide I/O for the system 100. Exemplary computer system 100 is powered by a power supply 114 with voltage regulator 115. The peripheral devices often include keyboards 191, mouse-type input devices 192, and other traditional I/O devices (not shown) that may include display monitors, floppy and hard disk drives, CD-ROM drives, modems, and printers. The number of I/O devices being added to personal computer systems continues to grow. For example, many computer systems also include terminal devices, televisions, sound devices, voice recognition devices, electronic pen devices, and mass storage devices such as tape drives, or digital video disks ("DVDs"). The peripheral devices usually communicate with the processor over one or more peripheral component interconnect ("PCI") slots 166, universal serial bus ("USB") ports 175, or integrated device electronics ("IDE") connectors 176. The PCI slots 166 may use a card/bus controller 165 to connect to one or more buses such as host bus 120, PCI bus 160, and low pin count ("LPC") bus 180, with the buses communicating with each other through the use of one or more hubs such as graphics controller memory hub 140 and I/O controller hub 170. Typical systems such as exemplary system 100 often include network interface cabling slots 198 to accommodate network cards that mediate between the computer and the physical media over which transmissions to and from system 100 travel. The USB ports 175 and IDE connectors 176 may connect to one or more of the hubs 140, 170. The hubs may communicate with each other through the use of one or more links such as hub link 190. Many I/O devices can also be accommodated by parallel ports 193 and serial ports 194 that are coupled to an I/O controller 187 that is in turn coupled to a LPC bus 180. Typical computer systems often include a graphics card 130 coupled to a graphics memory controller hub 140 by a graphics bus 135 and a main memory 150 coupled to a graphics memory controller hub 140 by a system management ("SM") bus 130. Finally, a typical computer system also includes software modules known as the basic input/output system (BIOS). The BIOS code 184 is usually stored on the firmware hub 186 in memory 183.

Exemplary computer system 100 in FIG. 1 includes a primary audio I/O connector 145 and a secondary audio I/O connector 195 to which audio I/O devices can be coupled to connect them to the audio controller 155, and transistor 146 pulls a device coupled to primary audio I/O connector 145 to a substantially zero voltage level when a device is coupled to secondary audio I/O connector 195. A first embodiment of the present invention is represented conceptually in FIG. 1 as a transistor 146 coupled to connectors 145 and 195 and ground.

In the present disclosure, a transistor may be conceptualized as having a control terminal that controls the flow of current between a first current handling terminal and a second current handling terminal. An appropriate condition on the control terminal causes a current to flow from/to the first current handling terminal and to/from the second current handling terminal. In a bipolar NPN transistor, the first current handling terminal is the collector, the control terminal is the base, and the second current handling terminal is the emitter. A sufficient current into the base causes a collector-to-emitter current to flow. In a bipolar PNP transistor, the first current handling terminal is the emitter, the control terminal is the base, and the second current handling terminal is the collector. A current exiting the base causes an emitter-to-collector current to flow.

A FET may likewise be conceptualized as having a control terminal that controls the flow of current between a first current handling terminal and a second current handling terminal. Although FETs are frequently discussed as having a drain, a gate, and a source, in most such devices the drain is interchangeable with the source. This is because the layout and semiconductor processing of the transistor is symmetrical (which is typically not the case for bipolar transistors). For an N-channel FET, the current handling terminal normally residing at the higher voltage is customarily called the drain. The current handling terminal normally residing at the lower voltage is customarily called the source. A sufficient voltage on the gate causes a current to therefore flow from the drain to the source. The gate-to-source voltage referred to in an N-channel FET device equations merely refers to whichever diffusion (drain or source) has the lower voltage at any given time. To reflect the symmetry of most N-channel FETs, the control terminal is the gate, the first current handling terminal may be termed the "drain/source," and the second current handling terminal may be termed the "source/drain." Such a description is equally valid for a P-channel FET, since the polarity between drain and source voltages, and the direction of current flow between drain and source, is not implied by such terminology. Alternatively, one current handling terminal may be arbitrarily deemed the "drain" and the other deemed the "source," with an implicit understanding that the two are not distinct, but interchangeable.

Referring to FIG. 2, a functional block diagram of a circuit 200, an exemplary computer audio circuit with two inputs or outputs, is shown. Circuit 200 comprises disabling device 210 and circuit element 227, which, taken together, represent a second embodiment of the present invention. Circuit element 227 couples filter circuit 220 with inverting amplifier 230 and serves as a DC blocking cap. Exemplary circuit 200 further comprises a filter circuit 220, an inverting amplifier 230, and an integrating amplifier 240. Exemplary circuit 200 further comprises primary audio I/O coupling 250, secondary audio I/O coupling 255, audio input reference voltage coupling 260, audio input power coupling 265, microphone bias supply coupling 266, and primary audio input disable signal coupling 213. Exemplary circuit 200 further comprises circuit element 281, which couples audio input reference voltage coupling 260 to circuit element 227 and inverting amplifier 230 at a point in circuit 200 disposed between circuit element 227 and inverting amplifier 230. Exemplary circuit 200 further comprises audio I/O coupling 270, which couples exemplary circuit 200 to the remainder of exemplary computer system 100.

Referring to FIG. 3, a circuit diagram of a circuit 300, an exemplary computer audio circuit with two inputs, is shown. Circuit 300 comprises disabling device 210 and circuit element 227, which, taken together, represent a second embodiment of the present disclosure. Disabling device 210 comprises circuit element 212 and FET 211 where the drain is coupled to primary audio input coupling 250, the source is coupled to ground, and the gate is coupled to primary audio input disable signal coupling 213. Filter circuit 220 comprises circuit elements 221, 222, 223, 224, 225, 226 and 228. Inverting amplifier 230 comprises circuit elements 231, 232, 233 and 234, and operational amplifier 235. Integrating filter 240 comprises circuit elements 236, 241, 242, 243, 244 and 280, and operational amplifier 245.

One skilled in the art will recognize that the foregoing components and devices in FIGS. 1, 2, and 3 are used as examples for the sake of conceptual clarity and that various configuration modifications are common. Consequently, as used herein the specific exemplars set forth in FIGS. 1, 2, and 3 are intended to be representative of their more general classes. In general, use of any specific exemplar herein is also intended to be representative of its class, and the non-inclusion of such specific devices in the foregoing list should not be taken as indicating that limitation is desired.

What is claimed is:

1. An apparatus comprising:
   a first audio input/output (I/O) connector provided for coupling to a first audio I/O device;
   a second audio I/O connector provided for coupling to a second audio I/O device;
   the first and second connectors being coupled to an audio controller by a circuit including:
   a first circuit element coupling a filter device and an inverting amplifier;
   a disabling device coupled to the filter device;
   an integrating amplifier, the second audio I/O connector coupled between the inverting amplifier and the integrating amplifier;
   a primary audio input disable connection and the first audio I/O connector coupled to the disabling device; and
   a second circuit element coupling an audio input reference voltage connection between the first circuit element and the inverting amplifier.

2. The apparatus of claim 1, further comprising a PCI bus connecting a PCI card slot to a card/bus controller, the audio controller connected to the PCI bus, and an I/O controller hub connected to the PCI bus.

3. The apparatus of claim 2, further comprising a super I/O controller connected to the I/O controller hub.

4. The apparatus of claim 1, wherein the first audio I/O connector comprises a jack.

5. The apparatus of claim 1, wherein the second audio I/O connector comprises a jack.

6. A computer system, comprising:
   a processor;
   a memory coupled to the processor;
   an audio controller coupled to the processor;
   a first audio I/O connector coupled to the audio controller and provided for coupling to a first audio I/O device;
   a second audio I/O connector coupled to the audio controller and provided for coupling to a second audio I/O device;
   a circuit coupled to the computer system including:
   a first circuit element coupling a filter device and an inverting amplifier:
   a disabling device coupled to the filter device;
   an integrating amplifier, the second audio I/O connector coupled between the inverting amplifier and the integrating amplifier;
   a primary audio input disable connection and the first audio I/O connector coupled to the disabling device; and
   a second circuit element coupling an audio input reference voltage connection between the first circuit element and the inverting amplifier.

7. The computer system of claim 6, further comprising a PCI bus connected to a PCI card slot and to a card/bus controller, the audio controller connected to the PCI bus, and an I/O controller hub connected to the PCI bus.

8. The computer system of claim 7, further comprising a super I/O controller connected to the I/O controller hub.

9. The computer system of claim 8, wherein the first and second audio I/O connectors each comprise a jack.

10. The computer system of claim 6, wherein the first audio I/O connector is a jack.

11. The computer system of claim 10, wherein the second audio I/O connector comprises a jack.

* * * * *